United States Patent [19]
Sardo, Jr.

[11] 3,748,640
[45] July 24, 1973

[54] SEAT BELT SYSTEM FOR AUTOMOTIVE VEHICLES

[76] Inventor: Vincent Sardo, Jr., 220 W. Skyline Lake Dr., Ringwood, N.J. 07465

[22] Filed: Dec. 21, 1971

[21] Appl. No.: 210,327

[52] U.S. Cl............ 340/52 E, 180/82 C, 307/105 B, 340/278
[51] Int. Cl. ........................... B60q 1/00, B60r 21/10
[58] Field of Search .......................... 340/52 E, 278; 307/105 B; 180/82 C, 101, 102

[56] References Cited
UNITED STATES PATENTS

| | | | |
|---|---|---|---|
| 3,449,714 | 6/1969 | Farley, Jr. .......................... | 180/82 C |
| 3,506,305 | 4/1970 | Eineman, Jr. et al. ............. | 340/52 E |
| 3,665,385 | 5/1972 | Booth ................................ | 340/52 E |

Primary Examiner—John W. Caldwell
Assistant Examiner—Glen R. Swann, III
Attorney—Ralph R. Roberts

[57] ABSTRACT

The circuit of this invention provides a safety belt system for both shoulder and seat belts which require the driver and any passengers to positively fasten the seat and shoulder harness in a sequential manner in order for the automobile to be started. After the engine is started, disconnection of any belt or harness causes a buzzer or like alarm to be actuated. The circuit is shown as being operable with either of two relay systems. One system uses a latching relay the other uses a stepping relay.

8 Claims, 5 Drawing Figures

Patented July 24, 1973

INVENTOR.
VINCENT SARDO JR.
BY
Ralph K Roberts
AGENT

Patented July 24, 1973

INVENTOR.
VINCENT SARDO JR.
BY
Ralph K. Roberts
AGENT

Patented July 24, 1973 3,748,640

INVENTOR.
VINCENT SARDO JR.
BY
Ralph R. Roberts
AGENT

Fig-5

INVENTOR.
VINCENT SARDO JR.
BY
Ralph R Roberts
AGENT

SEAT BELT SYSTEM FOR AUTOMOTIVE VEHICLES

BACKGROUND OF THE INVENTION

1. Field of the Invention

With reference to the classification of art as established in the United States Patent Office, this invention pertains to the general class of "Communications, Electrical" and to the subclasses directed toward "traffic and vehicle" and in particular to the subclasses of "automatically responsive to condition of vehicle" and also the further subclass "and controlling". Another pertinent subclass is that of "automatically responsive to condition" and in particular to "seat occupancy".

The general class of "Motor Vehicles" is also pertinent as are the subclasses of "safety devices" and particularly the subclass thereunder of responsive to "operator and passenger weight."

2. Description of the Prior Art

There are a large number of patents directed toward insuring that seat belts, when installed in a vehicle, are used by the occupants thereof. Some of these patents such as the U.S. Pat. No. 3,437,993 issued to RECIO etal, on Apr. 8, 1969 are so designed that in addition to the sensing of a presence on a seat there in required a coupling of the seat belt. Other systems like that provided in U.S. Pat. No. 3,359,539 to FINK as issued on Dec. 19, 1969 and U.S. Pat. No. 3,449,714 to FARLEY as issued on June 10, 1969 attempt to provide a "foolproof" seat belt system. Insofar as is known, the above-identified systems and others known propose to employ not only a switch activated by the weight of a passenger but also require that the belt be buckled. Signals such as flashers, buzzers, etc., are used to call attention to the failure to fasten the belt and in some systems the starter solenoid is also rendered inoperative unless the belt is fastened. These systems can be defeated in their purpose by those who do not want to "buckle up". To avoid the required coupling of the belt over the lap, the operator may defeat the known systems by coupling the belt behind the seat or by coupling the belt and then laying the coupled belt at the rear of the seat.

The present invention prevents this defeating of the system by using one of two methods of relay systems, either of which must be actuated in a determined sequence in order to energize the starter solenoid. In other words, the system of the present invention requires that when the occupant of a seat leaves the seat, the seat belt and harness must be disengaged and when the seat is reoccupied, the belt and harness must be open or opened and then be connected. By using a belt retractor device it also becomes necessary that the seat belt and shoulder harness be extended sufficiently to go around or over an occupant so that switch contacts are energized before the vehicle can be started. This arrangement makes it impossible for anyone to let his seat belt remain connected behind the seat or incorporate any similar method for permanentaly avoiding the proper use of the seat belt and harness.

SUMMARY OF THE INVENTION

This invention may be summarized at least in part with reference to its objects. It is an object of this invention to provide, and it does so provide, a circuit and system for vehicles equipped with safety seat belts and, where desired, shoulder harness wherein the system requires a positive "buckling up" or connection of the seat belt and harness after the seat has been occupied by a driver and/or passenger or passengers.

It is a still further object of this invention to provide, and it does provide, a circuit and system for vehicles equipped with safety seat belts and shoulder or like harness wherein the belts and harness cannot be left connected as behind the seat so as to avoid "buckling up" in a contemplated manner for the safety consideration of the vehicle occupants.

This invention comprises a circuit wherein the safety belts and/or shoulder harness carry electrical conductors which terminate with connectors adapted to be joined to complete an electric conduction means. The circuit and system connects relays in one of two methods; in one arrangement a latching relay is used and in the other arrangement a stepping relay is used. In either mode it is required that the seat belt retractor for each seat belt in the vehicle and a switch under each seat of a car be a series connected so that latching relays established for each seat position are activated each time a seat belt and/or shoulder harness is moved to operate the retractor and then relaxed to allow the retractor to return the belt and/or harness to the relaxed condition. These relays and the circuit contacts are sequenced by a latching or a stepping relay to prevent the circumventing of the belt safety system by merely leaving the seat belt and/or shoulder harness in a closed condition on or behind the seat.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific circuit of the seat belt system for automotive vehicles and in two modes is adapted for use with presently conformed seat belts and/or shoulder harness and showing a preferred means for the operation of the system using a relay system to insure the proper use of the belts. This specific embodiment, as shown in two arrangements of relays, has been chosen for the purpose of illustration and description as shown in the accompanying drawings wherein:

In the following description and in the claims various details will be identified by specific names for convenience. These names, however, are intended to be generic in their application. Corresponding reference characters refer to like members throughout the several figures of the drawings.

The drawings accompanying, and forming part of, this specification disclose certain details for the purpose of explanation of the invention, but it should be understood that details may be modified in various respects without depature from the concept and principles of the invention and that the circuit and components shown may be incorporated in other circuits than that shown.

DESCRIPTION OF THE PREFERRED EMBODIMENT

Figure 1:
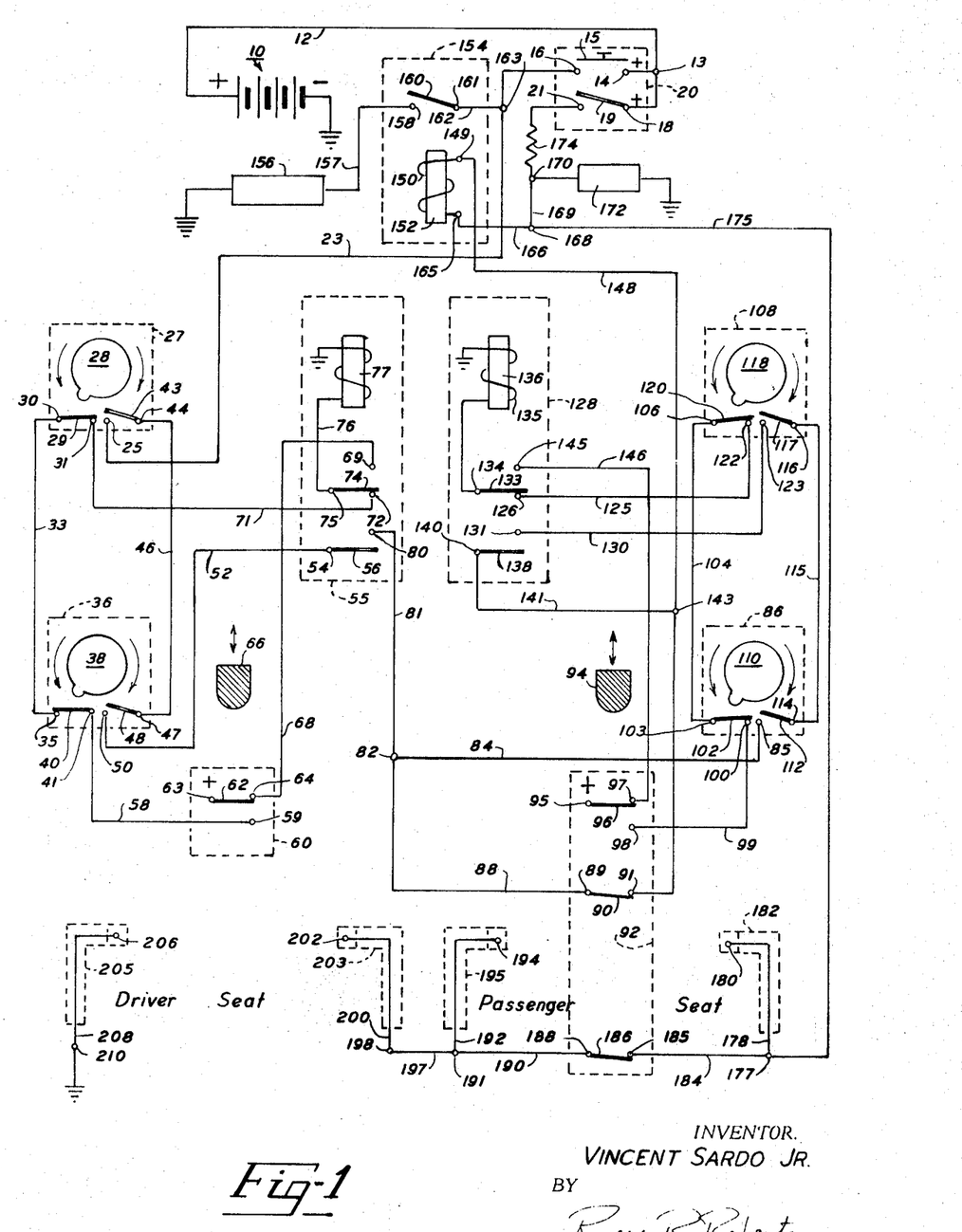
FIG. 1 represents a circuit diagram of a safety seat belt circuit and shows the circuit for two seats of a vehicle, said circuit using a latching relay to insure that a prescribed sequence is followed before engine starting can be accomplished.

PREFERRED CIRCUIT OF FIG. 1

Referring now in particular to the seat belt safety system as depicted in FIG. 1, there is shown a preferred circuit in which a logical operational sequence of "buckling up" must be accomplished before the vehicle in which the system is installed can be started. From a storage battery 10 positive (plus) current is fed through conductor 12 to a junction 13 which feeds the plus side contact 14 of a momentary start switch. Bar 15 is disposed to be pushed into engagement with both contact 14 and an open side contact 16. From junction 13 the plus voltage also leads to the plus contact 18 and blade portion 19 of the ignition switch 20. Contact 16 represents the open or other side connection of the momentary start switch 15 from which the plus voltage is fed through conductor 23 to open contact 25 of a retractor device 27. The retractor includes a cam plate 28 which cam plate as the retractor is actuated is rotated in either a clockwise or a counterclockwise direction. The plate cam is shown with its lobe position on when the retractor is in the relaxed condition and with bar 29 in conducting relationship with both contacts 30 and 31. A conductor 33 connects contact 30 with a contact 35 of a retractor device 36 which is similar to, if not identical with, the retractor device 27. This retractor device 36 has a cam plate 38 which is rotated in either a clockwise or a counterclockwise direction. The cam plate 38 is shown its lobe positioned as when with the retractor in the relaxed condition and with a bar 40 in current conducting relationship with contact 35 and a contact 41.

Referring again to the retractor device 27, and open conductor bar 43 is connected to contact 44 and from said contact a conductor 46 leads to and is attached to a contact 47 and an attached conductor bar 48. A contact 50 is attached to conductor 52 attached to a contact 54 in latchng relay 55. This contact 54 is attached to conductor bar 56.

From contact 41 a conductor 58 leads to an open contact in a seat switch 60. This switch has a conductor bar 62 attached to contact 63 connected to the plus side of battery 10 while the other end of conductor bar 62 is in engagement with contact 64. The seat switch 60 is actuated by the downward movement of a plunger 66 when this driver seat is occupied. From contact 64 a conductor 68 carries current to a contact 69 in latchng relay 55. From contact 31 a conductor 71 carries current to a contact 72 in latching relay 55. A conductor bar 74 is attached to contact 75 which is connected by lead 76 to the latching magnet 77. From a contact 80 a conductor 81 leads to a junction 82 from whence conductor 84 leads to a contact 85 in a retractor device 86 which is similar to or like retractors 27 and 36. Also leading from junction 82 is conductor 88 which is connected at 89 to a conductor bar 90 in engagement with a contact 91 of a three-pole switch 92. This switch is the seat weight detecting switch activated by a plunger 94 attached to the seat and moved downwardly by the weight of a passenger.

The upper pole of the three pole switch 92 is fed plus voltage to a contact 95 from the battery 10 by a conductor, not shown. A conductor bar 96 carries this current to either contact 97 or contact 98 when there is a weight in the seat to move plunger 94 downwardly.

From contact 98 a conductor 99 extends to a contact 100 which, as shown, is in contact with a conductor bar 102 of the retractor 86. This conductor bar is attached to contact 103 which carries current by conductor 104 to a contact 106 of a retractor 108 which is like retractors 86, 36 and 27. A cam plate member 110 of the retractor 86 engages conductor bar 102 or a conductor bar 112 during its two extremes of rotational movement. Bar 112 is pivotally connected to contact 114 and from this contact a conductor 115 is series connected to contact 116 attached to conductor bar 117 shown in open condition in retractor 108. A cam plate 118, as shown, has conductor bar 120 in a closed or current carrying condition with a contact 122 while contact 123 is in open condition with the conductor bar 117, as shown.

From contact 122 current is fed through conductor 125 to an engaged contact 126 of a latching relay 128 which is like relay 55 above-identified. From contact 123 a conductor 130 carries current to open contact 131 of relay 128. A conductor bar 133 connected to contact 134 is shown as in contact with the contact 126. The contact 134 is attached to lead 135 which is associated with the latching magnet 136 of relay 128. A conductor bar 138 is in open condition with contact 131 and is connected to contact 140 which is connected to a conductor 141 which ends at a terminal 143. A contact 145 is in open condition with conductor bar 133 which is connected to lead 146 which is connected to contact 97 in the three-pole switch associated with the passenger seating or loading.

From junction 143 a conductor 148 leads to an end 149 of a coil 150 associated with the holding magnet 152 of a holding relay 154. From a ground and a starter solenoid 156 a conductor 157 leads to a contact 158 of the holding relay 154. A conductor bar 160 is in open condition with contact 158 and is connected to contact 161 which is connected by lead 162 to junction 163 which permits a tap-off of the current through conductor 23. End 165 of coil 150 is attached to lead 166 and to junction 168. From junction 168 a lead 169 extends to junction 170. A buzzer 172 is attached to junction 170 and at its other end to ground. A resistor 174 of a determined capacity is attached to junction 170 and to contact 21.

From junction 168 the ground side of the circuit is carried by conductor 175 to junction 177 from whence flexible lead 178 extends to the connection end 180 of a seat belt member 182 as represented by the dashed outline. Also from the junction 177 a conductor 184 leads to contact 185 in engagement with the lowermost pole of switch 92. This lower pole is represented by conducting bar 186 which is in turn attached to contact 188 which is serially attached to conductor 190. The left end of conductor 190 is attached to junction 191 from which flexible lead 192 extends to the connecting terminal end 194 of seat belt half 195 shown in dashed outline.

From junction 191 a conductor 197 extends to connection 198 which is attached to flexible lead 200 extending to the connecting end 202 of the right-hand seat belt member 203 as represented also by dashed outline. A left-hand seat belt portion 205, also shown in dashed outline, has a connecting end 206 of a flexible lead 208 extending to connection 210 representing attachment to ground.

Use and Operation of the Circuit of FIG. 1

In the use and operation of the seat and shoulder harness safety system as shown in FIG. 1, it is contemplated that neither the driver nor passenger has entered the vehicle and that the retractors of the seat belts and shoulder harnesses are in a relaxed and open condition. Upon the driver entering the vehicle and placing himself on the driver's seat, the plunger 66 is moved downwardly to cause the seat switch 60 to be actuated. Conductor bar 62 is moved from contact 64 to contact 59. Assuming that each seat is equipped with both seat belts and separate shoulder harness, the driver "buckles up" by connecting belt portion 205 to portion 203. This causes retractor 36 to be rotated clockwise to bring the cam 38 from engagement with bar 40 to conductor bar 48. When the shoulder harness, not shown, is connected, the retractor 27 is rotated clockwise to move the lobe of cam plate 28 from closing engagement of the bar 29 to closing engagement of the bar 43. Assuming that there is no passenger in place, the retractors 86 and 108 and three-pole switch 92 will stay in the condition shown in FIG. 1. The driver now buckled up inserts a key into the ignition switch 20 and, with the turning of the key, the contact bar 15 is moved from the condition of FIG. 1 to engage contacts 14 and 16 so that a plus voltage flows to starting relay 154. With pulling conductor bar 160 in engagement with contact 158, current flows through closed conductor bar 160 to the starter solenoid 156 of the vehicle. Starter solenoid 156 is energized and the engine is turned over and hopefully started. If the driver decides to remove the shoulder harness or unbuckle the seat belt, either of which disconnects the established ground through conductor 175, the positive current flowing through blade 19 will cause the buzzer 172 to sound since a ground line is established through resistor 174 and buzzer 172.

When the driver unbuckle and leaves the vehicle the released plunger 66 by a biasing means not shown, is moved upward to cause conductor bar 62 to again move to contact 64 and a plus voltage to flow to contact 69 of the latching relay 55 which at that time was in contact with conductor bar 74. This causes a plus voltage to flow and energize magnet 77, causing the relay to move conductor bars 56 and 74 to the position shown. When a driver re-enters a car and seats himself, the plunger 66 moves conductor bar 62 to engage contact 59 and a plus voltage to flow to contact 41. If, and providing that, the driver returned his seat belt and shoulder harness to the uncoupled and relaxed condition, the retractor cam plates 28 and 38 are as shown.

A plus voltage will flow to conductor bar 40 and bar 29 thence to contact 72 and then through bar 74 to energize relay 55 and cause a position to be taken which is opposite that shown. When the driver "buckles up" and "hooks up" the seat belt a ground is established through conductors 208 and 200, thence switch 92 and then conductors 184 and 175 to relay 154. Conductor bars 43 and 48 are connected to contacts 25 and 50 so that when the key is turned a plus voltage flows through contact bar 15 and closed conductor bars 43 and 48. This plus voltage flows through bar 56 which is now in contact with contact 80 then through conductors 81 and 88 and with no passenger in the seat to actuate plunger 94 through closed conductor bar 90 and conductor 148 and places a plus voltage on holding relay 154 and conductor bar 160 to close and energize the starter solenoid.

If a passenger is in the car with the driver, the passenger's weight causes plunger 94 to "make" conductor bar 96 with contact 98; to "break" conductor bar 90 from contact 91 and conductor bar 186 to "break" from contact 185. By "breaking" bar 90 and contact 91 plus voltage from conductor 88 cannot go to the relay magnet 152 but does flow from junction 82 to contact 85. Providing the passenger seat belt and shoulder retractors were restored to the relaxed condition the last time the vehicle was used, the plus voltage on conductor bar 96 flows through 98 of the three-pole underneath passenger switch 92 and then through conductor 99, contact 100, bar 102, conductor 104, bar 120, conductor 125, bar 133 and the magnet 136 to energize the relay 128 and cause it to set opposite, as shown.

Now when the passenger fastens his seat belts 195 and 182 and the shoulder harness, the retractors are rotated so that the cam plates 110 and 118 "make" contacts 85 and 123, allowing a plus voltage supplied from the driver's relay 55 to flow from junction 82 to flow through conductor bar 112, conductor 115, bar 117, conductor 130, bar 138, conductor 141 and 148 to holding relay 154. Now with the passenger seat belt and shoulder harness connected as in FIG. 3, the ground from connection 210 flows to and through conductor 175 to the magnet in relay 150 enabling the starter solenoid 156 to be energized as above-described.

If, after starting the engine of the vehicle, either the seat belt of the passenger or driver is unbuckled (unhooked) the ground lead 175 is broken and will cause a plus voltage to flow to and through the buzzer 172. If the seat belt is left fastened or is refastened, the buzzer is silent or will cease to sound.

For simplification, only a driver's seat and a single passenger's seat system is shown in FIG. 1. Any number of passenger seats may be added using a series circuit following from and each using a relay such as 128, retractors 108 and 86 and a three-pole switch 92. The grounding circuit, which may be used with a shoulder harness strap, has not been shown but where desired or required would be in series with the grounding circuit.

Figure 2:
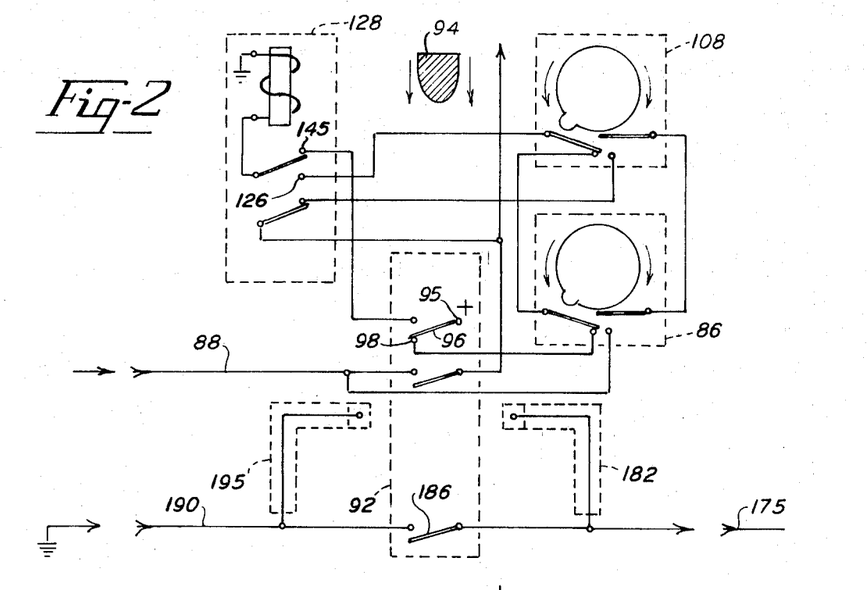
FIG. 2 represents a fragmentary portion of the circuit diagram of FIG. 1 and shows the position of the contacts in a latching relay with a passenger sitting in the seat and without the seat belt being fastened.

Fragmentary Circuit of FIG. 2

Referring now to the fragmentary circuit shown in FIG. 2, the passenger's seat latching relay system is shown with a passenger sitting in the seat without the seat belt being fastened. A plus voltage from conductor bar 96 to contact 98, through conductor bar 102 of retractor 86 and conductor bar 120 of retractor 108 to conductor bar 133 of latching relay 128 causes the contacts to change position and then stay in that position until it receives a subsequent plus voltage from switch 92 through contact 97, to contact 145 of latching relay 128, through conductor bar 133 which will cause relay 128 to change position once again.

Figure 3:
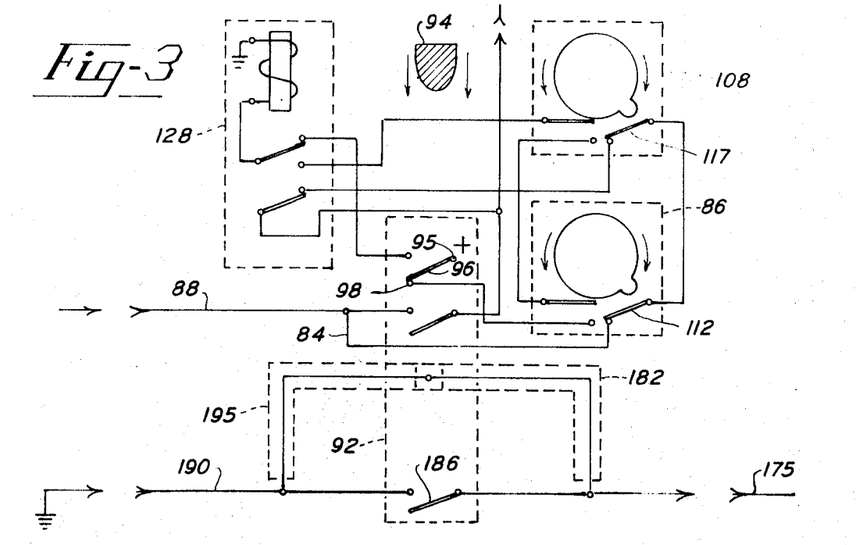
FIG. 3 represents the fragmentary portion of the circuit diagram of FIG. 2 with the seated passenger now having the seat belt fastened.

Fragmentary Circuit of FIG. 3

Referring now to the fragmentary circuit as shown in FIG. 3, the passenger's seat latching relay system is shown with a passenger sitting in the seat and with the seat belt extended and connected to provide a ground connection between conductors 190 and 175. The retractors 86 and 108 are extended to cause conductor bars 112 and 117 to move to conducting relationship so that the plus voltages from conductor 88 are fed through conductor to and through bars 112 and 117 to fed a plus voltage to the relay 154, not shown in this fragmentary circuit.

Figure 4:
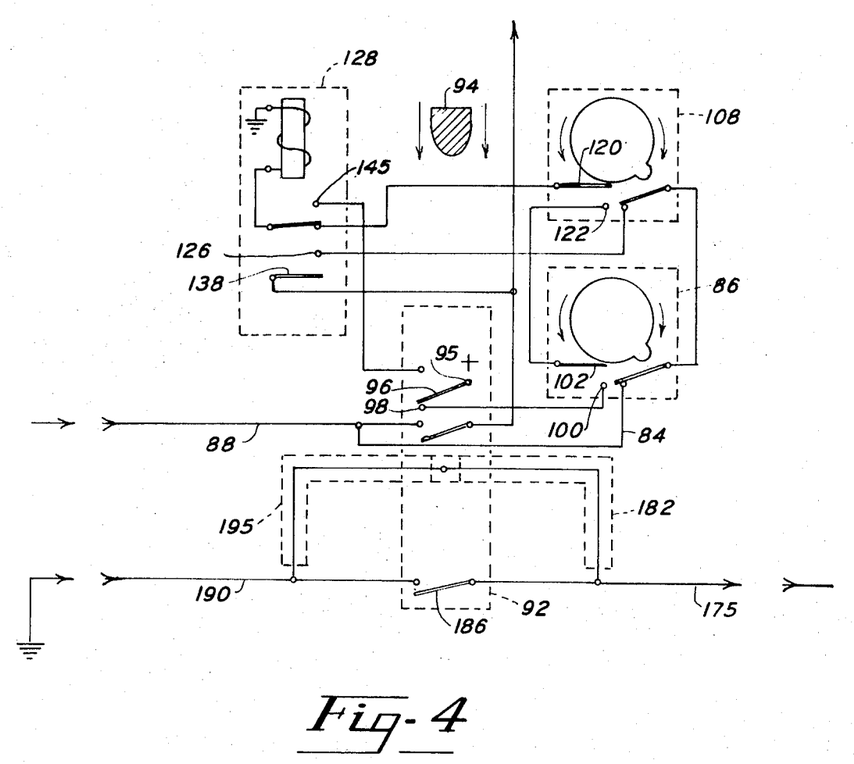
FIG. 4 represents the fragmentary portion of the circuit of FIG. 3 and shows the position of the contacts when the passenger has placed himself in the seat while and when the seat belt has remained fastened from the previous use of the seat.

Fragmentary Circuit of FIG. 4

Referring now to the fragmentary circuit as shown in FIG. 4, the passenger's seat latching relay system is shown with a passenger sitting in the seat with the belt fastened behind the seat from the time before. The plus voltage from conductor 88 and the driver's seat relay cannot get through because conductor bar 138 is open with contact 126 of relay 128. The plus voltage from contact 95 in switch 95 cannot reach relay 154 since both conductor bar 120 and bar 102 are respectively open with contact 122 and contact 100. Until both the seat belt and shoulder harness retractors are returned to open condition, the relay 128 cannot be reset.

The circuit sequence, as shown in FIGS. 2, 3 and 4, is typical of all seats, including the drivers, in which either a seat belt and/or shoulder harness means is to be employed.

Figure 5:
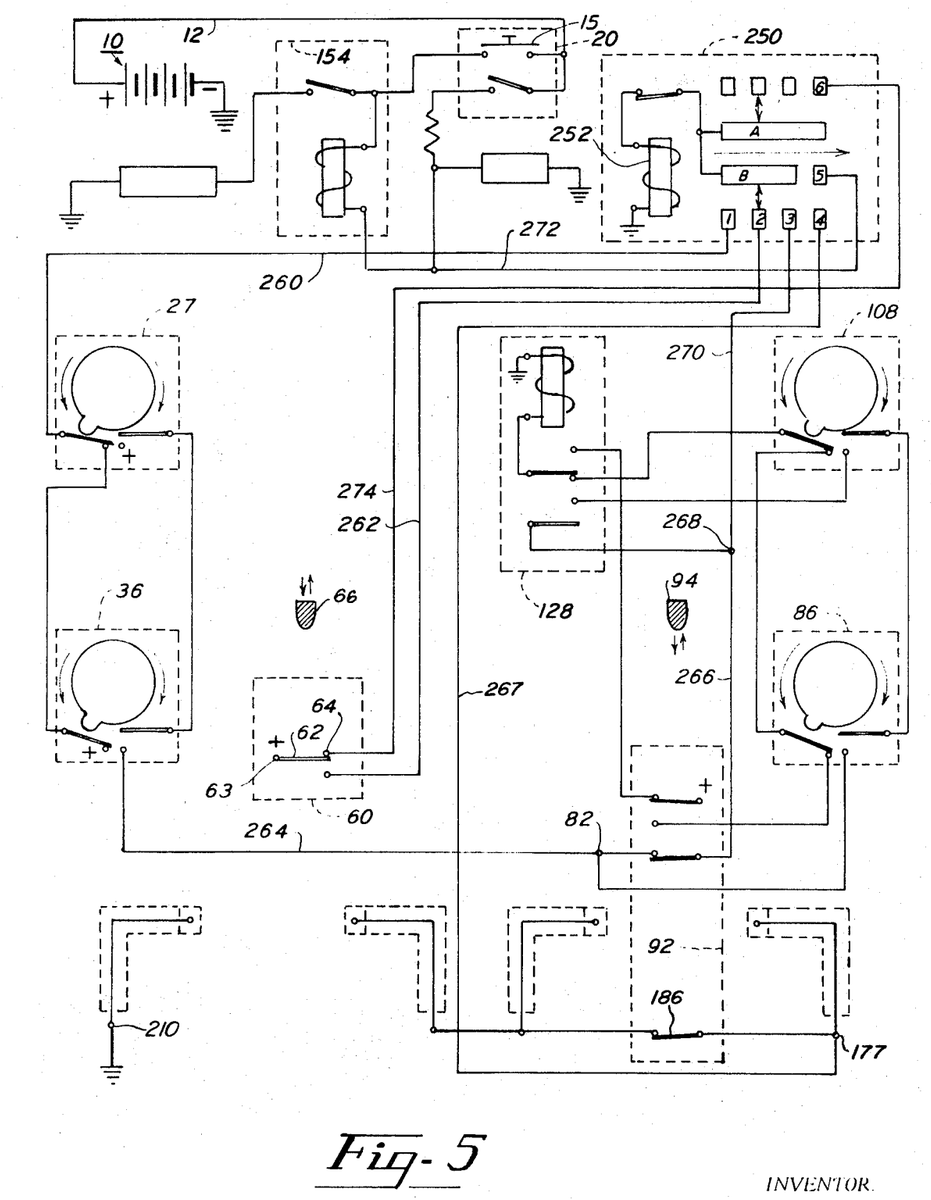
FIG. 5 represents an alternate circuit diagram like the circuit of FIG. 1 but with a stepping relay used instead of the latching relay for programming the use sequence of the driver's seat.

Alternate Circuit of FIG. 5

Referring finally to FIG. 5 and the circuit depicted therein, the latching relay 55 of FIG. 1 has been deleted in favor of a stepping relay 250 having an energizing magnet 252 adapted to move a traveling contact bar along a track to sequentially bring contacts 1, 2, 3 and 4 into engagement with conductor B and finally contact 5. At the same time a like traveling contact bar engages and is stepped along conductor A to finally engage contact 6. Before the driver places himself on the seat to move plunger 66, a plus pulse is fed from the relaxed retractors 27 and 36 to and through conductor 260 to contact 1 which will feed a positive pulse to conductor B and to energizing magnet 252. The traveling contact bars are moved to position 2. When the driver places himself in the seat, a pulse is fed by conductor 262 to contact 2. This causes the energizing magnet 252 to be actuated to move the traveling contacts bars to position 3. When the retractors 27 and 36 are extended by the "buckling up" of the seat belt and a shoulder harness, a pulse is fed to and through conductor 264 to junction 82 whereat the pulse will sample both switch 92 and retractors 86 and 108 to insure that if a passenger is present he also is properly "buckled up." If there is no passenger, a plus current will flow through line 266 to junction 268 and conductor 270 to contact 3 which will cause energizing magnet 252 to move the traveling contact bar to cause contacts 4 and 5 to be conductive and feed a ground through conductor 272 from connection 210 through 186 conductor bar to connection 177 through conductor 267 closing relay 154 and permitting the vehicle to be started by keying switch 20. When the driver leaves the car, conductor bar 62 of driver's switch 60 is moved to the condition shown whereby from contact 64 a pulse is fed through conductor 274 to contact 6 where, from the traveling conductor, feeds a pulse through bar A to cause the stepping relay to be reset for a repeat of the cycle.

As in FIG. 1, the seat belts and shoulder harness must be connected and disconnected in a prescribed completion or else a ground is not furnished and the relays are not set to bring the vehicle ignition system into a condition for starting.

In all the above arrangements, the retractors must be extended and relaxed or else the starter solenoid will not operate. Also the belts cannot be left in a connected condition to circumvent the necessity of "buckling up" whenever the vehicle is to be used. The circuits of FIGS. 1 and 5 show no conductor for the shoulder belts to provide a circuit continuation of the ground conductors provided by hooking up the seat belts. The relays 55 and 128, although preferably latching relays, may also be bistable relays if desired and solid state switching equivalents may be provided as alternates providing equal switching paths. It is only necessary that the relay means associated with the retractor be stable until actuated to an opposite setting by a subsequent pulse.

"Relay logic" as used in the following claims is intended to apply to a relay which is pulsed to move the relay from one state to a second state whereat it is maintained until moved to another or its first state by a next pulse. Either a latching or a bi-stable relay having these characteristics may be used for relays 55 and 128 in FIG. 1 and relay 128 in FIG. 5. One of these relays is ued with each seat switch which includes that for the driver. In FIG. 5, stepping relay 250 is used for relay 55 and is also pulse actuated and as it advances from step to step checks the circuit of each seat circuit to insure proper connections thereof rather than use the less expensive series circuit of FIG. 1.

Potter and Brumfield relays (TM of AMF) as shown and supplied by Texas Instrument Supply, 4 Nevada Drive, Lake Success, Long Island, New York 11040, in their Catalog printed in 1969 shows such relays on page 237.

For example, latching relays of the "FL series" or "TL series" may be used. Bistable type relays (1 form C) may also be substituted for the latching relays numbers 55 and 128. Stepping relays are shown and identified as "GMIN" Series and may be used for relay 250 of FIG. 5.

It is to be noted that the Federal Motor Vehicle Safety Standards, Part 571, Docket 69-7, Notice 16, Department of Transporation, Occupant Crash Protection, requires only that seat belt retractors be extended four inches rather than "buckling up." If compliance with this requirement is made and a conducting path through the seat belt is not desired, a ground path actuated by the retractor may be provided and connected to point 168. Although the circuit, so altered, will comply an essential safety feature of requiring the belts to be buckled is lost.

A light indicator or other signaling device may be provided in the circuit if desired. As they are well known in the art they are not included in the exemplified circuits disposed to provide only the fool proof sequence of "buckling up."

Terms such as "left" "right" "up" "down" "bottom" "top" "front" "back" "in", "out" "clockwise" "counterclockwise" and the like are applicable to the embodiments shown and described in conjunction with the drawings. These terms are merely for the purposes of description and do not necessarily apply to the position in which the seat belt circuits may be constructed or used.

While a particular circuit of the seat belt system for automotive vehicles and an alternate circuit has been shown and described, it is to be understood the invention is not limited thereto since modifications may be made within the scope of the accompanying claims and protection is sought to the broadest extent the prior art allows.

What is claimed is:

1. A seat belt system for automotive vehicles and the like in which there is provided a plurality of seat belts arranged as pairs with each seat belt pair having at least one retractor providing a portion of an interlock system requiring said seat belt to be extended after the seat is occupied in order to permit the vehicle's starter solenoid to be actuated by a current supplied by a battery carried in said vehicle, said system including: (a) a plurality of seat belts arranged as pairs, one pair of belts for the driver and the other pairs for potential passengers with each pair positioned and secured to the vehicle so as to accommodate one occupant when seated on a seat of the vehicle; (b) at least one retractor associated with each seat belt pair and adapted to retain one of said belts of the pair, said retractor secured to the vehicle so that said associated seat belt when moved to and from an extended condition causes a cam operatively connected to said retractor to separately engage one of a pair of switches associated therewith so that with the retractor in repose condition a first switch is closed and the second switch is open and when the retractor is moved to the extended condition the moved cam disengages from engagement with the first switch which opens while the moved cam engages the second switch and causes it to be closed; (c) an ignition relay having a switch which is actuated by a holding coil which when energized closes said switch and establishes a conductive circuit from the vehicle battery to the starter solenoid; (d) a starter logic including a key-operated ignition switch and the ignition relay, said starter logic being actuated when the key is turned and to an electrical current to be fed from said ignition switch to the driver's seat retractor and from this retractor only when the retractor is extended to cause the first associated switch to be opened and the second associated switch to be closed, and in the absence of additional passengers said electrical current to be conducted to one side of said ignition relay coil, said electrical current at the same time being fed to the second switch of the next passenger's seat belt retractor; (e) a plurality of seat switches carried by the vehicle and associated with the seat so that one of said seat switches is associated with each seat belt pair and the retractor used with the belt pair; (f) a plurality of relay logics with an individual logic being exclusively actuated by each associated seat switch, each of said relay logics having two electrically actuated states, the first state being effective when said seat is unoccupied and the second state being effective when said seat is occupied said second state establishing a circuit between said second switch of the retractor and ignition relay holding coil, said logic returnable to its first state only when the seat again becomes unoccupied, each seat switch being actuated by the weight of an occupant on the seat immediately above to open one switch portion thereof and by closing a second switch to transfer a voltage to said relay logic through said retractor, and with the absence of an occupant the switch returns to its "at rest" condition with the voltage sent through the first switch and with the second switch moving to open condition; (g) an audible signal having a first side connected to a battery source and the other to a ground source, the first side being connected when the ignition switch is closed; (h) a conductive circuit from a ground source to the audible signal and ground side of the ignition relay coil, said conductive circuit being established only when the seat belts to all occupied seats are connected, this circuit when connected providing a conductive path to the ground side of the ignition relay coil to energize this coil and close the relay switch to energize the starter solenoid, said circuit also connected to the first side of the audible signal and when conductive renders the signal ineffective, this circuit including a by-pass switch associated with each passenger seat switch, the seat switch of the driver having no by-pass switch, said by-pass switch being normally closed to provide a conductive path portion of the circuit until opened by the weight of a passenger on the switch, and (i) a series circuit extending from the driver's seat switch and retractor to the associated relay logic, said circuit connected to the retractor switch and associated logic so that the actuation of a seat switch with the retractor in its "at rest" condition will move the associated relay logic from its "at rest" state to its second state by a voltage fed to and through the actuated seat switch and through the closed first switch of the retractor to the relay logic, the relay logic remaining in this state during the occupation of the seat and connecting of the associated seat belt, and with the ground conductive circuit established by the connecting of the associated seat belt of each occupied seat to establish a conductive path around the opened by-pass switch of each occupied seat, the disconnection of any seat belt of an occupied seat causing a discontinuance of the ground circuit and actuation of the audible signal, and when the occupant leaves the seat the switch is closed to feed a voltage to the relay logic to reset this logic to its first "at rest" state.

2. A seat belt system as in claim 1 in which the relay means associated with each of the seats is a latching relay.

3. A seat belt system as in claim 1 in which the relay means associated with the driver's seat and retractor is a stepping relay.

4. A seat belt system as in claim 1 in which the retractors are moved rotatably clockwise and counterclockwise with and against a tension means and the cam carried thereby is attached to the retractor and is moved therewith to engage only one of the two switches when the retractor is at one of the two extremes of retractor movement.

5. A seat belt system as in claim 1 in which the seat switch for the driver is a single-pole double-throw switch actuated by a spring-biased plunger attached to a portion of the seat and the seat switches for all possible passenger occupied seats are three-pole, double-throw switches actuated by a spring-biased plunger attached to a portion of the seat.

6. A seat belt system as in claim 1 in which each occupant seat space has two retractors associated with a seat switch, each retractor having a cam disposed to actuate at its two extremes of movement only one of two switches associated with the retractor, the first switches of these retractors being series connected in one circuit and the second switches of the retractors being series connected in a second circuit so that the two retractors, to render the audible signal ineffective must be used to provide a like arrangement of the cams and switches in both retractors.

7. A seat belt system as in claim 6 in which the seat belt pairs have conductive means carried therein and end connectors disposed to be engaged to provide the conductible path through the connected pair of belts.

8. A seat belt system as in claim 1 in which the audible signal is a buzzer.

* * * * *

UNITED STATES PATENT OFFICE
CERTIFICATE OF CORRECTION

Patent No. 3,748,640    Dated July 24th, 1973

Inventor(s) Vincent Sardo, Jr.

It is certified that error appears in the above-identified patent and that said Letters Patent are hereby corrected as shown below:

line 39, change "position on" to read -- positioned as --;

line 47, insert -- with-- after "shown";

line 48, delete "with" first occurrence.

Col. 5, lines 38 and 39, insert quotation marks around "buckled up";

line 43, delete "pulling";

line 54, change "unbuckle" to read -- unbuckles --.

Col. 6, line 39, change "conductor" second occurrence to read -- conductors --.

Col. 7, line 17, change "fed" to read -- feed --;

line 28, change "95" second occurrence to read -- 92 --;

PO-1050
(5/69)

UNITED STATES PATENT OFFICE
CERTIFICATE OF CORRECTION

Patent No. 3,748,640   Dated July 24th, 1973

Inventor(s) Vincent Sardo, Jr.

It is certified that error appears in the above-identified patent and that said Letters Patent are hereby corrected as shown below:

Col. 8, line 23, change "bistable" to read -- bi-stable --;

line 36, change "ued" to read -- used --;

line 49, change "Bistable" to read -- Bi-stable --.

Col. 9, line 3, " "left""right" " should read -- "left","right"

Col. 9, lines 3 and 4, insert commas after end quotation marks between terms to read -- "up", "down", "bottom", "top", "front", "back", "in", "out", "clockwise" -- .

Signed and sealed this 22nd day of January 1974.

(SEAL)
Attest:

EDWARD M. FLETCHER, JR.
Attesting Officer

RENE D. TEGTMEYER
Acting Commissioner of Patents